United States Patent Office 3,766,271
Patented Oct. 16, 1973

3,766,271
HOMOGENEOUS CATALYSTS USEFUL IN THE REDUCTION OF NITROPARAFFINS TO AMINES
John F. Knifton, Poughquag, N.Y., assignor to Texaco Inc., New York, N.Y.
No Drawing. Filed Mar. 4, 1971, Ser. No. 121,131
Int. Cl. C07c 85/00
U.S. Cl. 260—563 R  8 Claims

ABSTRACT OF THE DISCLOSURE

This invention relates to a process for reducing nitroparaffinics containing 3 to 20 carbon atoms by heating said nitroparaffins at reaction temperatures ranging from 35° C. to 150° C., in a highly alkaline, substantially non-aqueous reaction medium with a ruthenium or iron homogeneous catalyst, in a substantially hydrogen atmosphere at superatmospheric pressures of at least 100 p.s.i.g. and continuing heating said reaction mixtures until the nitroparaffins are reduced to the corresponding amines.

---

This invention concerns the use of homogeneous catalysts to reduce nitro-organic substrates to their corresponding amines. More particularly, this invention concerns the use of homogeneous metal complexes as reducing agents for nitroparaffin substrates with greater selectivity and yield than can be obtained with heterogeneous catalysts.

Until comparatively recently homogeneous metal catalysts have mainly been used in the conversion of unsaturated organic molecules particularly those with olefinic and acetylenic bonds to their hydrogenated oxygenated and/or isomerized derivatives. Particularly favored were linear olefins both of the alpha and internal type. Homogeneous catalysts have become especially popular in these reductions because they appear to offer several practical advantages over heterogeneous catalysts. Typical heterogeneous catalyts comprise an inert microporous support such as alumina, carbon, magnesia, chromia, silica and their mixtures, having microporous structure and a very large internal surface area which can, in some instances, approach areas of 1,000 square meters per gram or even higher. Ordinarily these catalytic supports contain or have deposited upon them finely divided and activated metals or metalloids. These include platinum, palladium, nickel, rhodium and the like. The very nature of their physical structure causes these heterogeneous catalysts to form distinct and separate phases in the reaction mixture which, it can be theorized, minimize contacts between the substrate to be converted and the catalytic entity. Further, because the activity of these catalysts is believed to be intimately related to their large surface area, many of these types of heterogeneous catalysts are readily deactivated or poisoned by a variety of materials known as catalyst poisons. This, in turn, requires fairly frequent replenishment, or where economically feasible, low cost processes of regeneration. Other disadvantages generically associated with heterogeneous catalysts are that they usually require more extreme conditions of temperature and pressure, and to some extent exhibit relatively poor selectivity.

By selectivity, as defined herein, is meant the efficiency in catalysing a desired conversion relative to other undesired reactions. In this instance reduction of the nitro group to the amine is the desired conversion. Selectivity is usually expressed as a factor representing the amount of the amine formed, divided by the amount of starting nitroparaffin converted. Amine yield here refers to the fraction representing the amount of amine formed, divided by the amount of nitroparaffin charged. Inasmuch as low selectivity, catalyst poisoning, as well as lower yields, are undesirable problems more commonly associated with heterogeneous than homogeneous catalysts, there has been an increasing tendency to turn to the latter type catalysis.

For example, homogeneous catalyst complexes have been increasingly favored in order to obviate some of the problems attributed to heterogeneous catalysts, such as multiple phase formation, poisoning and mediocre selectivity, which have inherently been associated with heterogeneous catalysis.

However, most of the reported homogeneous catalysis work has been directed toward the conversion of unsaturated organic molecules especially those with olefinic and/or acetylenic bonds to their hydrogenated and/or isomerized derivatives. While homogeneous catalysts have been shown to be especially useful in the reduction of olefins, both of the internal and alpha type, there has been little known work using homogeneous catalysts in the reduction of other than carbon-to-carbon bonds.

Recently, the applicant has developed a novel process and has provided reaction parameters which enable the extension of homogeneous catalytic techniques to be extended to the reduction of nitroparaffins to their corresponding amine. Not only are selectivities and yields good, but the resultant paraffinic amines can be recovered from the reaction mixtures by standard procedures normally used in amine isolation and purification. These include acid extraction followed by treatment of the amine salt product with alkali to provide the free amine.

Inasmuch as the amine products derived from the reduction of nitroparaffin substrates are relatively free from contaminants and tenacious by-products, they lend themselves to wide scale and novel applications. For these reasons the development of the inventive process represents a significant advance in the homogeneous catalysis art.

In view of the above, it is an object of this invention, among others, to extend the use of transition-metal homogeneous catalyst complexes as reducing agents from the hydrogenation of carbon to carbon unsaturation to the reduction of nitroparaffins.

Another object of this invention is to provide a series of relatively inexpensive homogeneous metal complexes which can be used to provide amines of high quality, relatively free from contaminants under reduction conditions of moderate severity.

Further objects of this invention will become apparent to the reader upon perusal of this disclosure.

In practice, the above objects, among others, will be achieved by the following procedure or minor modifications of it:

(a) in the contemplated practice, each mole of nitroparaffin substrate to be reduced is admixed with at least one transition-metal catalyst complex, in an alkaline, substantially non-aqueous media, in the presence of inert solvent, sufficient to solubilize said nitroparaffins and catalyst to form a reaction mixture.

(b) heating said alkaline reaction mixture containing nitroparaffin substrate catalyst and optional inert solvents, under superatmospheric pressures, in the presence of at least a stoichiometric (with respect to nitroparaffin) quantity of hydrogen, until substantial reduction of the nitroparaffin to the corresponding amine takes place, and (c) separating the amine contained therein.

In the favored practice an alkaline, substantially anhydrous reaction mixture comprising nitroparaffin substrate is formed by (a) admixing said substrate with one or more of said aforedescribed transition-metal catalyst complexes, said molar ratio of said nitroparaffin to said metal catalyst ranging from about 0.5 to 20 moles of catalyst for each mole of nitroparaffin catalyst in the presence of a basic solvent media comprised of an inert solvent, a polar solvent and a solid or liquid strong base, (b) heating said reaction admixture between about 35°–135° C. under superatmospheric pressures ranging from about 100 p.s.i.g. and upwards, under a substantially anhydrous environment of gaseous hydrogen, for at least a period of time sufficient to substantially reduce said nitroparaffinic substrate to its corresponding amine, and (c) isolating said amines contained therein.

In order to aid in the full understanding of the inventive concept, the following additional disclosure is submitted:

(A) Nitroparaffin substrate.—Any paraffinic substrate containing from 3 to 20 carbon atoms, or more, and at least one nitro group per molecule may be employed. The most useful substrates are the mononitro linear and cyclic-nitroparaffins such as the nitrobutanes, nitropentanes, nitrohexanes, nitroheptanes, nitrooctanes, nitrononanes, nitrodecanes, nitroundecanes, nitrododecanes, as well as their higher homologues. The favored substrates are mixtures of linear nitroparaffins containing from 8 to 20 carbon atoms, with the preferred nitroparaffin substrates being those n-linear nitroparaffin mixtures containing 10 to 14 carbon atoms. The nitroparaffin substrates can be in the form of pure or partially purified nitration mixtures derived from any number of different nitration procedures. The favored nitration mixtures are derived from the vapor-liquid phase nitration of mixtures of n-paraffins. The substrates for reduction can comprise single, discrete nitroparaffins or their mixtures, neat or containing inert solvents or diluents, such as paraffins, ethers and the like. These mixtures of nitroparaffins are preferred since they are readily available at relatively low cost and they lend themselves to substantially complete conversions to the desired corresponding amine within relatively short reaction times.

(B) Inert diluent and solvents.—The novel reduction process can be run most readily in the presence of sufficient inert diluent to form a homogeneous single-phase reaction mixture. Since a homogeneous, or uniform, reaction mixture offers the most convenient vehicle in which to rapidly reduce the nitroparaffines to amines in good yield, the use of inert solvent is preferred in most instances. Furthermore, inasmuch as the preceding nitration of the n-paraffins is frequently conducted in a reaction mixture containing a large excess of the n-paraffins as compared to nitrating agent, the substrate for reduction can contain as much as 75 to 85 weight percent of the n-paraffins and only 25 to 15 weight percent as nitrated substrate. However, broadly speaking, any liquid in which the nitroparaffin substrate and catalyst are soluble and which are inert to reduction under the conditions of the inventive process, can be used as diluents. These include alkyl ethers, such as diethyl ether, dibutyl ethers, aromatics such as benzene, toluene and xylene, as well as their mixtures with or without the aforementioned n-paraffinics. It is frequently necessary that the homogeneous catalysts, particularly the ruthenium and iron complexes, be handled in a solvent media also containing a solvating agent which is polar and which contains an active hydrogen atom. Preferably the active hydrogen is present in a hydroxyl group. Suitable solvating agents include mono and polyhydric aliphatic, aromatic and cycloaliphatic alcohols. Examples include methanol, ethanol and the propanols.

(C) Reducing atmosphere.—Insofar as can be determined, the homogeneous catalyst, possibly in some intermediate, more active form, abstracts hydrogen from the environmental, hydrogen atmosphere. While nitrogen or inert gases such as helium, argon or neon may be present in small proportions (less than 20% by volume) without adversely effecting conversions or yields, their presence appears to offer no concurrent advantages and, therefore, is to be avoided.

Ordinarily, the reaction vessel capable of being pressurized, agitated, heated and cooled is charged with all of the components of the reaction mixture, nitroparaffin, catalyst system, solvents, etc. These components either individually or collectively may be flushed with inert gas such as argon or nitrogen because of their possible sensitivity to oxidizing agents such as air. The residual flushing or purging of inert gaseous environment is accomplished with hydrogen and the reaction mixture pressurized to the desired extent and heated in a substantially hydrogen atmosphere until the desired reduction to aliphatic amine takes place.

(D) Reduction temperature.—The reaction temperature for reduction is in many ways quite flexible. At temperatures below about 35° C., however, the rate of reduction to the amine is quite slow, while at temperatures much above 150° C. yields fall off sharply, probably due to catalyst decomposition, and for this reason these higher temperatures are to be avoided. Inasmuch as the best yields of amine have been obtained at reduction temperatures between about 35° and 135° C. at pressures greater than atmospheric, when the preferred homogeneous ruthenium or iron complexes are used as the above catalysts, these temperatures represent the preferred temperature range.

(E) Reduction pressures.—Pressures greater than atmospheric (0 p.s.i.g.) are required to obtain reasonable rates of reduction at reaction temperatures above 95° C. Superatmospheric pressures ranging from about 100 p.s.i.g. to about 3000 p.s.i.g., coupled with reduction temperatures of about 35° C. to 135° C. consistently give the best yields within reasonable reaction times and for this reason are preferred.

(F) Reaction times for substantial reduction.—The times required for substantial reduction of the nitroparaffins to the corresponding amines is a variable, dependent primarily upon the temperature and pressure employed, the particular nitroparaffin substrate to be reduced and the catalyst system employed, among other factors. Ordinarily the reaction times will vary between about 2 to 24 hours. In most instances times ranging from at least about 3 hours to about 8 hours under the preferred conditions of temperature and pressure are required for substantial reduction and these reaction times represent the preferred range of reaction times.

(G) Catalyst system.—The homogeneous catalysts of this invention are selected from the groups of the Periodic Table[a] consisting of Groups III-A, IV-A, V-A, VI-A, VII-A, VIII, the noble metals, mercury and mixtures of one or more of these metals. These metals may be employed in the form of their ionic solutions or complexes in varying oxidation states, usually between −2 to +8 by well known and well documented references in the technical literature.[a]

While all of the above metals are utilizable under the appropriate combination of reaction conditions to reduce nitroparaffin to their corresponding amines, as is usually the case in any large group or class, one or more members of the subgroup or subclass, for one reason or another, are favored, compared to the class as a whole. In the instant case the favored metal catalysts are those comprising the Group VIII metals, particularly iron and ruthenium and/or mixtures of these metals.

While the above more restricted grouping of metals are useful as catalysts in an alkaline media to reduce nitroparaffins to their amines, in certain instances, for reasons present inexplicable, the reproducibility of some of the metals is erratic. For this reason the preferred catalysts are iron and ruthenium since they give reasonable and reproducible yields of the desired amine product under relatively mild reduction conditions within a reasonably short reaction time.

In order to disclose the workings of the invention, particularly as to the form of the metal catalyst when it is employed, the discussion will be limited to ruthenium whose behavior as a homogeneous catalyst is believed to be atypical of the other catalytic entities particularly iron.

Insofar as is known, any ruthenium compound may be employed provided that two conditions are met, namely:

(1) that the reaction media is strongly basic, i.e., having a pH of at least 11 when measured at 25° C.
(2) that the ruthenium catalyst is soluble and does not precipitate in the alkaline, non-aqueous medium used for the reduction.

Preferably, but not necessarily, the metallic compound as typified by ruthenium is one which contains displaceable ligands. However, in some instances it is desirable to use a solvating agent to convert the ruthenium compound to a more soluble form. The solvating agent usually comprises a polar solvent containing an active hydrogenation atom preferably contained in a hydroxyl group. Suitable solvating agents include alkanols such as ethanol and propanol aromatics such as benzene, toluene, xylene, chlorinated aliphatics such as dichloromethane, as well as the mixtures of these alkanols and aromatics.

It is not essential that all of the ruthenium compound shall be in solution at the beginning of the reduction provided that at least a catalytic amount is present. A catalytic amount as defined herein refers to an amount sufficient under the appropriate combination of temperature and pressure parameters to initiate the desired reduction. In the instance of ruthenium if at least 0.01 mole of ruthenium per mole of nitroparaffin are present, catalysis will take place. Larger ratios of catalyst to substrate do not appear to be deleterious and are primarily limited by economics. Preferably the ruthenium compound is used in the form of a complex containing one or more neutral π-bonding ligands such as carbonyl (CO), substituted carbonyl, nitrosyl (NO) and/or a ligand containing a donor atom of Group IV-B, Group V-B or Group VI-B of the aforementioned Periodic Table. These ligands may or may not be displaced during hydrogenation. While no mechanism is postulated or is relied upon for patentability, it is believed that the catalysts as typified by ruthenium, form stable hydride species which are soluble in the liquid basic reaction medium used. The neutral ligand is preferably an organic substituted phosphine or arsine such as $PR_3$, $AsR_3$ where P and As represent their respective elements and R is a symbol for hydrocarbyl radical, particularly phenyl or alkylated phenyl. One or more of the radicals may be the same or different at any different time. Suitable anionic ligands include Cl—, Br—, CN—, NCO, $CH_3COO$—, with the halogens being preferred.

Illustrative ruthenium complexes which function effectively as reducing agents in the basic reaction media include

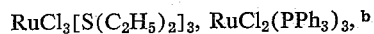
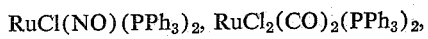
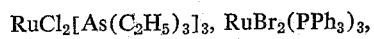
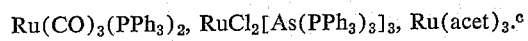

Illustrative iron complexes which function effectively include the preferred iron pentacarbonyl ($Fe(CO)_5$) as well as

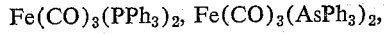

The alkaline media required for the homogeneous metal complexes to function as reducing agents for nitroparaffin reduction include, among others, the alkali metal hydroxides, methoxides, carbonates, etc., as well as nitrogenous bases. These include triethylamine, diethanolamine, pyridine, triethylenetetramine, n-hexylamine, 1,3-diaminopropane, etc.

The mole ratio of nitroparaffin substrate (as typified by mixtures of $C_{10}$–$C_{14}$ nitroparaffins) to homogeneous catalyst (as typified by ruthenium complexes) should not exceed about 100:1, preferably to achieve optimum yields, with a high order of reproducibility a lower range of about 20:1 to 1:1 of substrate to catalyst should be employed.

(H) Experimental procedure.—The reductive process is ordinarily performed as follows:

A conveniently sized reactor fitted with gas inlet, condenser, stirring, heating and pressurizing means, is charged with catalyst solution, preferably deoxygenated, nitrated paraffin, inert solvent, if any, and alkaline material. The agitated reaction mixture is sealed and heated to above 95° C. under superatmospheric pressure provided by hydrogen.

Work-up of the product mixture is a follows: After hydrogen absorption has substantially ceased, indicating completion of the reduction, the pressurized reactor is cooled and excess gas bled off. The reaction mixture containing amine product, catalyst and volatiles has the volatiles evaporated off under reduced pressure and the spent catalyst is filtered or removed by centrifugation. The reaction mixture contained in the filtrate is then recovered by one or more of the methods used to separate amines from contaminants. For example, the amine can be steam distilled or extracted with mineral acid. In the latter case, the amine salt is converted (sprung) to the free amine by neutralization with a basic material.

In any event, the amine product can be further purified or used as obtained, dependent upon product application. In general, the amines are identified by gas chromatog-

---

[a] Periodic groups as described in "Advanced Inorganic Chemistry," 2d ed., by F. A. Cotton and G. Wilkinson, Interscience, 1966.
[b] Where Ph is a symbol for the phenyl radical $C_6H_5$.
[c] Where acet is a symbol for the acetylacetonate group ($CH_3COCHCOCH_3$)-.
[d] Where en is a symbol for ethylenediamine.
[e] Where naph is a symbol for the naphthenate group ($C_{10}H_7CO_2$)-.

raphy (GC), infrared spectra (IR) and/or nuclear magnetic resonance (NHR) spectra.

Having described the inventive process in general terms, the following examples are submitted to supply specific illustrative embodiments:

EXAMPLE 1

Preparation of a mixture of $C_{10}$–$C_{14}$ alkyl primary amines using homogeneous ruthenium catalyst complexes A suitable autoclave-type reactor provided with pressurizing, heating, cooling, agitating and distillation means is charged with an admixture of 2.0 mmole (1.96 g.) portion of commercially obtained tris(triphenylphosphine)-ruthenium(II) chloride dissolved in 50 ml. of nitrogen purged benzene. To this combined a mixture of ethanol (30 ml.), 12.5 ml. of a nitrated $C_{10}$–$C_{14}$ n-paraffin mixture (containing 6.0 mmole of $C_{10}$–$C_{14}$ nitroparaffins) and 10 mmole (0.56 g.) of potassium hydroxide. The deep red homogeneous liquid is sealed in the autoclave and heated to 120° C. under 1300 p.s.i.g. of hydrogen for 3 hours.

Upon cooling and bleeding off excess gas, the reddish-brown product is recovered from the reactor, and the light solvent removed by evaporation under reduced pressure. The precipitated ruthenium catalyst is filtered off, and recovered as a brown solid which is washed with a fraction of petroleum ether and air-dried. Identification is supplied by IR and elemental analysis. Unless otherwise specified, all measurements are by weight rather than volume.

The mixture of $C_{10}$–$C_{14}$ secondary alkyl primary amines is extracted from the filtrate by extracting twice with (1 N) hydrochloric acid, then sprung by neutralizing the combined acid extracts with an aqueous (2 N) sodium hydroxide solution. The amines were identified by GC, IR, and NMR techniques, and by comparison with other authentic amine samples. The amines were analyzed quantitatively by near IR spectroscopy.

EXAMPLE 2

Preparation of a cyclohexylamine from nitrocyclohexane using a homogeneous ruthenium catalyst complex Using the same apparatus, reduction procedure, isolation and purification technique described in Example 1, 2.0 mmoles (1.96 g.) of commercially obtained tris(triphenylphosphine)ruthenium(II) chloride dissolved in 50 ml. of nitrogen purged benzene is used to reduce 6.0 mmoles of nitrocyclohexane dissolved in 30 ml. of methanol containing 10 mmoles of potassium hydroxide. The temperature employed in the sealed reactor is 120° C. and the reaction is run under 1300 p.s.i.g. of hydrogen for 3 hours. Upon cooling, isolation, separation and purification of the product as described generally in Example 1, GC and IR confirm that the desired cycloaliphatic product has been prepared.

EXAMPLE 3

Preparation of dodecylamine product from nitrododecane using a homogeneous ruthenium catalyst complex In this procedure 9.0 mmoles of commercially derived nitrododecane dissolved in 25 ml. of n-dodecane, admixed with 3.0 mmoles of commercially obtained tris(triphenylphosphine) ruthenium(II) chloride dissolved in 50 ml. of nitrogen purged xylene containing 10 mmole of sodium hydroxide is reduced in a sealed reactor while heating to 120° C. for 4 hours under 1200 p.s.i.g. provided by hydrogen gas.

Isolation and separation of volatiles and catalyst are as described in Example 1. Confirmation of the product is obtained using IR and GC.

EXAMPLES 4–15

Further reductions of mixtures of $C_{10}$–$C_{14}$ nitroparaffins to the corresponding amines using a homogeneous ruthenium catalyst Using the procedures and apparatus of Example 1, the effect of changes in reaction temperature, hydrogen pressure and base concentration upon the yield of $C_{10}$–$C_{14}$ alkyl amines is shown in Table I. Each run is made using the tris (triphenylphosphine) - ruthenium(II) chloride catalyst solubilized in benzene, ethanol or benzene, methanol mixtures. It can be readily seen from this data that temperatures up to 145° C. together with hydrogen pressures of 100 p.s.i.g. or more, result in the highest yields of paraffin amine. Likewise, these high yields of amine are only possible in the presence of a strongly basic solvent media.

TABLE I

| Example | Molar ratio of nitroparaffin: $RuCl_2(PPh_3)_3$ | Base | Solvent | Molar ratio of nitroparaffin: alkali | Reactor temp., (° C.) | Initial pressure | Reaction time (hr.) | Amine yield (percent) |
|---|---|---|---|---|---|---|---|---|
| 4 | 3 | KOH | Benzene/ethanol | 0.6 | 126 | 1,300 | 3 | 81 |
| 5 | 3 | KOH | do | 0.6 | 126 | 1,300 | 8 | 45 |
| 6 | 3 | KOH | do | 0.3 | 120 | 1,200 | 3½ | 53 |
| 7 | 3 | KOH | do | 1.5 | 120 | 1,300 | 5 | 13 |
| 8 | 2 | KOH | do | 0.6 | 65 | Atm. | 5 | <5 |
| 9 | 3 | KOH | do | 0.6 | 120 | 100 | 3 | <5 |
| 10 | 3 | KOH | do | 0.6 | 120 | 500 | 5½ | 59 |
| 11 | 3 | KOH | do | 0.6 | 120 | 2,500 | 3 | 33 |
| 12 | 3 | KOH | do | 0.6 | 93 | 1,200 | 3 | 82 |
| 13 | 3 | KOH | do | 0.6 | 37 | 1,200 | 3 | 53 |
| 14 | 3 | KOH | do | 0.6 | 148 | 1,200 | 3 | <5 |
| 15 | 3 | None | do | ∞ | 120 | 1,200 | 5 | None |

EXAMPLES 16–25

Further reductions of mixtures of $C_{10}$–$C_{14}$ nitroparaffins to amines using a homogeneous ruthenium catalyst Using the procedures and apparatus of Example 1, the effect of changes in $RuCl_2(PPh_3)_3$ concentration upon the yield of $C_{10}$–$C_{14}$ amine is shown in Table II. Here it can be seen that molar ratios of nitroparaffin-to-$RuCl_2(PPh_3)_3$ ranging up to 20:1 or more result in the highest yields of desired amine. Examples 23 and 24 show the use of pyridine and triethylamine as a substitute base for potassium hydroxide. There is little or no nitroparaffin reduction in the absence of hydrogen (see Example 22).

It has been demonstrated that the spent ruthenium catalyst, as recovered in Example 1, can be redistributed in benzene, ethanol and used to catalyze the hydrogenation of further quantities of nitroparaffin charge (see Example 25). The catalyst had been recovered by precipitation after removal of a substantial portion of the solvent media by distillation.

In this reduction the hydrogenation procedure, separation technique and pressurized reactor, are similar to those

TABLE II

| Ex. | Molar ratio of nitroparaffin: $RuCl_2(PPh_3)_3$ | Base | Solvent | Molar ratio of nitroparaffin base | Reactor temp., °C. | Initial pressure | Reaction time (hr.) | Amine yield (percent) |
|---|---|---|---|---|---|---|---|---|
| 16 | 100 | KOH | Benzene/ethanol | 0.6 | 126 | 1,300 | 5 | 44 |
| 17 | 20 | KOH | do | 0.6 | 126 | 1,300 | 5 | 88 |
| 18 | 10 | KOH | do | 0.6 | 135 | 3,000 | 6 | 41 |
| 19 | 5 | KOH | do | 0.6 | 126 | 1,300 | 5 | 79 |
| 20 | 3 | KOH | do | 0.6 | 126 | 1,300 | 3 | 81 |
| 21 | 1 | KOH | do | 0.6 | 126 | 1,300 | 3 | 5 |
| 22 | 10 | KOH | do | 0.7 | 120 | (1) | 5 | <5 |
| 23 | 3 | Triethylamine | do | 0.12 | 120 | 1,300 | 20 | 7 |
| 24 | 3 | Pyridine | do | 0.12 | 120 | 1,200 | 20 | 33 |
| 25 [2] | 3 | KOH | do | 0.6 | 120 | 1,300 | 3 | 83 |

[1] 750 of $N_2$.
[2] Using recycled ruthenium catalyst from previous runs.

EXAMPLES 26–34

Reductions of mixtures of $C_{10}$–$C_{14}$ nitroparaffins to amines using other homogeneous ruthenium catalysts Using the procedure and apparatus of Example 1, the effect of using other solubilized ruthenium complexes as catalyst for nitroparaffin hydrogenation to amine is shown in Table III.

It has been demonstrated that various ruthenium complexes containing ruthenium in the zero, 2 and 3 oxidation states coordinated to carbonyl, nitrosyl, ketone and various alkyl and aryl phosphines and amine ligands are active catalysts for the subject hydrogenation. Simple ruthenium salts such as ruthenium trichloride hydrate are rapidly precipitated from solution under "normal" operating conditions.

employed in the first example. The procedure is generally as follows:

A 25 mmole portion of commercially derived $Fe(CO)_5$ (iron pentacarbonyl) or a designated homogeneous iron catalyst is dissolved in a solution comprising 50 ml. of nitrogen purged benzene. To this stirred mixture is added a solution of ethanol (20 ml.), and 15% nitrated $C_{10}$–$C_{14}$ paraffins (containing 25 mmole of $C_{10}$–$C_{14}$ nitroparaffins) and 50 mmoles of KOH. The stirred reactor is sealed, heated to 120° C. for 5 hours under 120 p.s.i.g. of hydrogen. After adsorption of hydrogen ceases, the reactor is cooled, bled of gas and separated from volatiles and catalyst by the methods described in Example 1 or similar methods.

Data on the reductions of identical mixtures of $C_{10}$–$C_{14}$ nitroparaffins by this same $Fe(CO)_5$ catalyst under a varie-

TABLE III

| Example | Catalyst | Molar ratio of nitroparaffin: catalyst | Solvent | Reactor temp. (°C.) | Initial $H_2$ pressure | Reaction time (hr.) | Amine yield (percent) |
|---|---|---|---|---|---|---|---|
| 26 | $RuCl_2(CO)_2(PPh_3)_2$ | 10 | Benzene/ethanol/KOH | 120 | 1,300 | 5 | 23 |
| 27 | $Ru(CO)_3Cl_2$ | 10 | do | 120 | 1,300 | 5 | 67 |
| 28 | $Ru(acet)_3$ [A] | 10 | do | 120 | 1,300 | 5 | 96 |
| 29 | $Ru(CO)_3(PPh_3)_2$ | 10 | do | 120 | 1,300 | 5 | 30 |
| 30 | $RuCl_3 \cdot 3H_2O$ | 10 | do | 120 | 1,300 | 6 | ([B]) |
| 31 | $RuCl(NO)(PPh_3)_2$ | 10 | do | 120 | 1,300 | 5 | 30 |
| 32 | $RuHCl(PPh_3)_3$ | 10 | do | 120 | 1,300 | 5 | 85 |
| 33 | $RuCl_2(AsPh_3)_3$ | 10 | do | 120 | 1,300 | 5 | 10 |
| 34 | $RuCl_2(As(C_2H_5)_3)_3$ | 10 | do | 120 | 1,300 | 5 | 10 |

[A] Acet=Acetylacetonate.
[B] Ruthenium=Salt rapidly precipitated from solution.

EXAMPLE 35

Preparation of a mixture of $C_{16}$–$C_{20}$ alkyl primary amines by reduction of the corresponding mixture of nitroparaffin using a homogeneous ruthenium catalyst In this reduction the hydrogenation procedure, separation technique, and pressurized reactor is similar to that employed in the first sample, but here the substrate is a mixture of $C_{16}$–$C_{20}$ nitroparaffins.

EXAMPLE 36

Preparation of propylamine from nitropropane

Similar to Example 1 but using nitropropane as substrate.

EXAMPLE 37

Preparation of mixtures of secondary $C_{10}$–$C_{14}$ secondary alkyl primary amines by the reduction of corresponding mixtures of nitroparaffins using a homogeneous iron catalyst ty of conditions (Examples 38–47) appear in Table IV. Hydrogenation of this nitroparaffin substrate appears to be favored by increases in $H_2$ pressure above atmospheric, together with temperatures of 176° C. or more. Note, no hydrogenation activity was observed in the absence of base.

The use of nitrogen gas instead of hydrogen gas with this catalyst, did result in some reduction of the nitroparaffin to amine (Example 47).

EXAMPLES 48–53

Preparation of a mixture of $C_{10}$–$C_{14}$ alkyl primary amines by the reduction of the corresponding mixture of nitroparaffins using various homogeneous iron catalysts Here various other phosphine, carbonyl, substituted carbonyl, acid and amine stabilized iron complexes were employed as catalysts for the hydrogenation of $C_{10}$–$C_{14}$ nitroparaffins to amines. Some activity was recorded in all cases as can be seen by the data presented in Table V which follows.

moderate reaction conditions of temperature and pressure and produces the amines in comparatively good yields in a

TABLE IV

| Example | Molar ratio of nitroparaffin: $Fe(CO)_5$ | Solvent | Base | Molar ratio of nitroparaffin: base | Reactor temp. (° C.) | Initial $H_2$ pressure | Reaction time (hr.) | Amine yield (percent) |
|---|---|---|---|---|---|---|---|---|
| 38 | 1 | Benzene/ethanol | KOH | 0.5 | 123 | 1,700 | 6 | 67 |
| 39 | 1 | do | KOH | 0.5 | 138 | 2,000 | 4 | 40 |
| 40 | 1 | do | KOH | 0.5 | 120 | 550 | 5½ | 37 |
| 41 | 1 | do | KOH | 0.5 | 76 | Atm. | 4 | 10 |
| 42 | 1 | do | KOH | 1 | 123 | 1,500 | 5 | 27 |
| 43 | 1 | do | None | | 120 | 1,500 | 5 | None |
| 44 | 0.5 | do | KOH | 0.5 | 120 | 1,500 | 5½ | 55 |
| 45 | 5 | do | KOH | 0.5 | 120 | 1,300 | 5 | 18 |
| 46 | 10 | do | KOH | 0.5 | 120 | 1,300 | 5 | 5 |
| 47 | 1 | do | KOH | 0.5 | 120 | (1) | 5 | 29 |

[1] 600 of $N_2$.

TABLE V

| Example | Catalyst | Molar ratio of nitroparaffin:catalyst | Solvent | Reactor temp. (° C.) | Initial $H_2$ pressure | Reaction time (hr.) | Amine yield (percent) |
|---|---|---|---|---|---|---|---|
| 48 | $Fe_3(CO)_{12}$ | 2.5 | Benzene/ethanol/KOH | 112 | 1,300 | 5 | 27 |
| 49 | $[Fe(CO)_4][Fe(en)_3]$ | 1 | do | 120 | 1,300 | 5 | 64 |
| 50 | $[C_2H_5Fe(CO)_4]_2$ | 2 | do | 118 | 1,300 | 6 | 20 |
| 51 | $Fe(CO)_3(PPh_3)_2$ | 2 | do | 120 | 1,300 | 7 | 15 |
| 52 | $Fe(acet)_3$ | 2 | do | 120 | 1,300 | 5 | 710 |
| 53 | $Fe(naphthanate)_3$ | 2 | do | 120 | 1,300 | 5 | 710 |

NOTE.—en=ethylenediamine; acet=acetylacetonate.

EXAMPLES 54–62

Preparation of mixtures of secondary $C_{10}$–$C_{14}$ alkyl primary amines from the corresponding nitroparaffins using other solubilized transition metal complexes from groups VI, VII and VIII of the Periodic Table The reduction described herein whose data is presented in Table VI below are run, using a pressurized reactor and using the reduction, separation and isolation techniques described in Example 1.

As previously described, the reductions are accomplished by admixing homogeneous catalysts —$RNO_2$ substrates in molar ratios ranging from 1:1 to 1:80 in the solvents and alkaline materials described at the temperatures and pressures shown in Table VI.

As the data of Table VI indicate, the corresponding nickel and cobalt and chromium carbonyls have slight catalytic activity in the basic reaction conditions used to reduce the nitroparaffins to the corresponding amines. Rhodium is inactive under the conditions under which ruthenium and iron catalysts function well. The manganese and molybdenum carbonyls and their complexes are too unstable in basic media to conduct meaningful reactions.

form readily isolated using pedestrian methods of separation and purification.

In addition to the above advantages the novel invention permits numerous changes, substitutions and modifications without departing from the inventive concept. For example, although ruthenium and iron complexes are the favored catalytic metals, numerous other transition metals can be used as catalyst in the form of various soluble ligands. The best indicia of the metes and bounds of this invention can be determined by the claims which follow, read in the light of the preceding specification.

What is claimed is:

1. A process for reducing nitroparaffins containing 3 to 20 carbon atoms to their corresponding paraffinic amines, utilizing homogeneous catalytic metal complexes, said homogeneous catalytic metal complexes being selected from the group consisting of $RuCl_2[P(C_6H_5)_3]_3$, $RuCl_2(CO)_2(P(C_6H_5)_3)_2$, $RuCl_2(CO)_3$, $Ru(CH_3COCHCOCH_3)_3$, $Ru(CO)_3[P(C_6H_5)_3]_2$, $RuCl(NO)[P(C_6H_5)_3]_2$, $RuHCl[P(C_6H_5)_3]_3$, $RuCl_2[As(C_6H_5)_3]_3$, $RuCl_2[As(C_2H_5)_3]_3$, $Fe(CO)_5$, $Fe_3(CO)_{12}$, $[Fe(CO)_4(Fe(NH_2CH_2CH_2NH)_3]$, $[FeC_2H_5(CO)_2]_2$, $F_2(CO)_3[P(C_6H_5)_3]_2$, $Fe(CH_3COCHCOCH_3)_3$ and $Fe(C_{10}H_7COO)$,

TABLE VI

| Example | Homogeneous catalyst | Molar ratio catalyst/ $HO_2$ | Solvent and alkaline materials (grams) | Reaction temp. (° C.) | Initial $H_2$ pressure | Time (hrs.) | Amine yield (percent) |
|---|---|---|---|---|---|---|---|
| 54 | $Ni(CO)_4$* | 1:2 | AQ. 75% ethylenediamine | 148 | (1) | (2) | 10 |
| 55 | $Ni(CO)_2(PPh_3)_2$ | 1:3 | Benzene/ETOH/KOH | 130 | 1,320 | 4 | None |
| 56 | $Co(CO)_3(Pn-Bu_3)$ | 1:4 | Benzene/piperidine | 135 | (3) | 5 | 5 |
| 57 | $Co_2(CO)_8$ | 1:1 | Benzene/ETOH/KOH | 120 | 1,300 | 8 | <5 |
| 58 | $RhCl(PPh_3)_3$ | 1:6 | do | 110 | 1,320 | 2 | None |
| 59 | $RhCl(CO)(PPh_3)_2$ | 1:80 | Benzene/piperidine | 126 | 1,500 | 2 | None |
| 60 | $Mn_2(CO)_{10}$ | | do | 126 | 1,500 | 2 | None |
| 61 | $Mo(CO)_6$ | | do | 126 | 1,500 | 2 | None |
| 62 | $C_6H_6Cr(CO)_3$ | 1:3 | Benzene/ETOH/KOH | 124 | 1,300 | 5 | 5 |

*Generated in situ.
[1] 500 plus 500 CO.
[2] Overnight.
[3] 1,000 plus 500 CO.

As the numerous examples and the detailed disclosure of this invention indicate, this invention is both novel and advantageous. For example, while homogeneous catalysts of the type disclosed are known to hydrogenate carbon to carbon unsaturation, this is believed to be the first disclosure of their utilization in the reduction of nitroparaffins to prepare the corresponding alkyl primary amines. Further, the reduction process is operable within relatively in a strongly alkaline, substantially non-aqueous media, said process consisting essentiall of:

(a) admixing each mole of said nitroparaffins to be reduced with at least about 0.01 moles of said catalytic complexes in a strongly alkaline, substantially non-aqueous media to form a reaction admixture, (b) heating said admixture of said complexes between about 35° C. to 135° C., in the presence of a substantially hydrogen atmosphere at superatmospheric pressures of at least 100 p.s.i.g.,
(c) maintaining said reaction admixture under said reaction temperatures and said reaction pressures, until said nitroparaffins are reduced to their corresponding paraffinic amines, and
(d) separating the paraffinic amines contained therein.

2. A process for reducing nitroparaffins containing 3 to 20 carbon atoms to their corresponding paraffinic amines, utilizing homogeneous catalytic metal complexes, said homogeneous catalytic metal complexes being selected from the group consisting of: $RuCl_2[P(C_6H_5)_3]_3$, $RuCl_2(CO)_3$, $Ru(CH_3COCHCOCH_3)_3$, $RuHCl[P(C_6H_5)_3]_3$, $Fe(CO)_5$ and $[Fe(CO)_4][Fe(NH_2CH_2CH_2NH)_3]$, in a strongly alkaline, substantially non-aqueous media, said process consisting essentially of:
(a) admixing each mole of said nitroparaffins to be reduced with at least about 0.01 moles of said catalytic complexes in a strongly alkaline, substantially non-aqueous media to form a reaction admixture,
(b) heating said admixture of said complexes between about 35° C. to 135° C., in the presence of a substantially hydrogen atmosphere at superatmospheric pressures of at lesat 100 p.s.i.g.,
(c) maintaining said reaction admixture under said reaction temperatures and said reaction pressures, until said nitroparaffins are reduced to the corresponding paraffinic amines, and
(d) separating the paraffinic amines contained therein.

3. The process of claim 1 wherein the nitroparaffin substrate is a mixture of nitroparaffins diluted with n-paraffins.

4. The process of claim 1 wherein the nitroparaffin substrate is a cyclic nitroparaffin.

5. The process of claim 1 wherein the non-aqueous, substantially non-oxidizing solvent media is provided by an aromatic hydrocarbon selected from benzene, toluene, xylene, and alkyl ethers.

6. The process of claim 1 wherein the non-aqueous solvent media contains a solvating agent which is polar and contains a hydroxyl group.

7. The process of claim 5 in which the solvating agent is a mono or polyhydricaliphatic or aromatic alcohol.

8. The process of claim 1 wherein the strongly alkaline condition is provided by a material selected from alkali metal materials, alkaline earth materials and organic nitrogen bases.

References Cited
UNITED STATES PATENTS

| | | | |
|---|---|---|---|
| 2,606,925 | 8/1952 | Whitman | 260—563 D |
| 3,177,258 | 4/1965 | Rylawder et al. | 260—580 |
| 3,470,252 | 9/1969 | Doyle et al. | 260—583 M |

LEWIS GOTTS, Primary Examiner

D. R. PHILLIPS, Assistant Examiner

U.S. Cl. X.R.

252—429 R, 431 C, 431 P, 441; 260—580, 583 N